May 10, 1927.

E. N. BAKER

ELECTRIC MOTOR

Filed July 14, 1924

1,627,949

Edgar N. Baker, Inventor

By Staley Bowman, Attorneys

Patented May 10, 1927.

1,627,949

UNITED STATES PATENT OFFICE.

EDGAR N. BAKER, OF SPRINGFIELD, OHIO, ASSIGNOR TO THE ROBBINS & MYERS COMPANY, OF SPRINGFIELD, OHIO, A CORPORATION OF OHIO.

ELECTRIC MOTOR.

Application filed July 14, 1924. Serial No. 725,819.

This invention relates to electric motors, it more particularly relating to single phase induction motors of the split phase type.

A motor of this type has two field windings one of the windings of a comparatively high reactance and a resistance as low as possible while the other winding has a lower reactance and a higher resistance so that the starting current for the former winding lags behind that of the latter winding which gives approximately the operating condition of a two phase motor. Generally, provision is made for opening the high resistance winding by a centrifugal switch, or other automatic means, after the motor starts, to prevent excessive heating, but motors of this type are also built in which both windings are kept in service continuously in which case the high resistance winding is made of wire sufficiently large to avoid excessive heating and the necessary high resistance is obtained by a special resistance unit which unit it has been common to place outside of the motor casing or frame, and the object of this invention is to provide an arrangement whereby the resistance is arranged inside of the motor frame or casing, thereby making the motor and resistance one self-contained unit.

Referring to the drawings.

Figure 2:
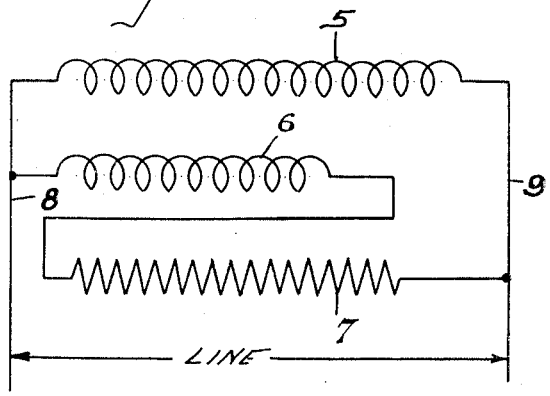
Fig. 2 is a diagram of the field windings and resistance.

Referring to the drawings, 1 represents the casing or frame of the motor, 2 represents the field and 3 the armature. The field windings are represented by 5 and 6 in Fig. 2, the winding 5 being of comparatively high reactance and a low resistance while the winding 6 has a lower reactance and a higher resistance, but in the present case the resistance of the winding 6 is such as to avoid excessive heating and the necessary resistance obtained by a resistance coil 7 placed in circuit with the winding 6 as indicated in the diagram shown in Fig. 2 in which 8 and 9 represent the line wires.

Figure 1:
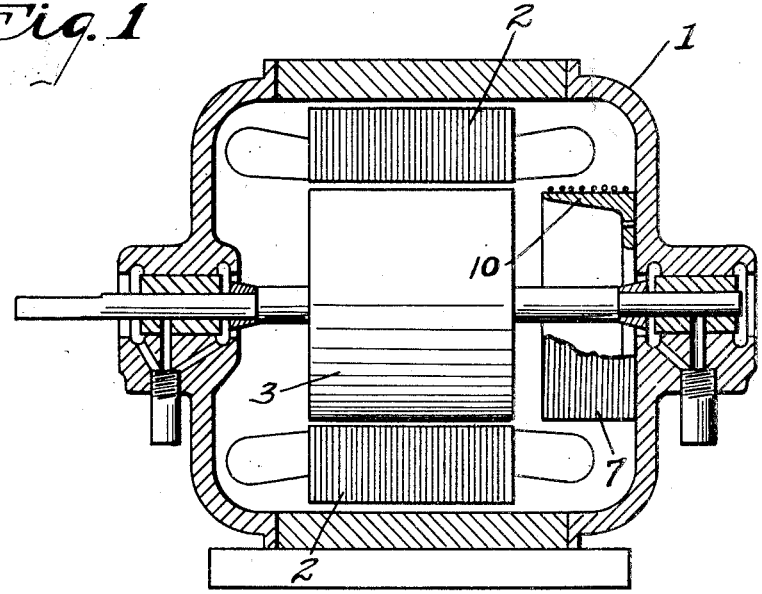
Fig. 1 is a vertical section of a motor embodying the improved arrangement.
Figure 3:
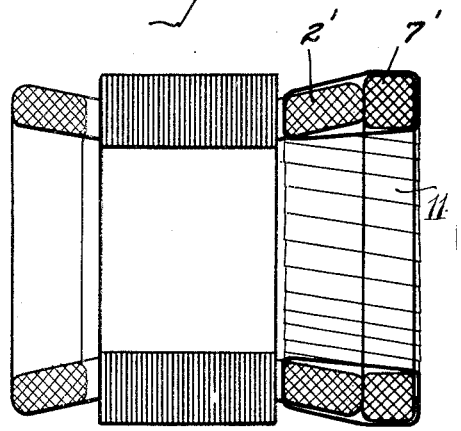
Fig. 3 is a vertical section of the field of the motor showing a modification in the manner of installation of the resistance coil.

The wire forming the resistance 7 is shown in Fig. 1 wound upon a drum or spool 10 connected to the interior wall of the motor casing or frame. In Fig. 3 the resistance coil is represented by 7' and is shown supported by the field windings 2', the coil being taped or otherwise secured to the windings, the tape being indicated at 11. In either case the resistance is supported inside the motor casing or frame and the whole constitutes a self-contained unit.

Having thus described my invention, I claim:

In a motor of the character described, a supporting casing, an armature and field windings supported in said casing, one of the windings being of high reactance and low resistance and the other winding of low reactance and high resistance, and a resistance in circuit with the latter winding, said resistance being located within said casing and supported by the field winding.

In testimony whereof, I have hereunto set my hand this 11th day of July, 1924.

EDGAR N. BAKER.